March 2, 1965 C. L. HEIZMAN 3,171,971

AMPLITUDE BISTABLE CIRCUITS

Filed Nov. 30, 1960 4 Sheets-Sheet 1

INVENTOR
CHARLES L. HEIZMAN

BY Stephen J. Limanek
ATTORNEY

AMPLITUDE BISTABLE CIRCUITS

Filed Nov. 30, 1960 4 Sheets-Sheet 4

United States Patent Office 3,171,971

Patented Mar. 2, 1965

3,171,971

AMPLITUDE BISTABLE CIRCUITS

Charles L. Heizman, Peekskill, N.Y., assignor to International Business Machines Corporation, New York, N.Y., a corporation of New York

Filed Nov. 30, 1960, Ser. No. 72,646

3 Claims. (Cl. 307—88)

This invention relates to bistable circuits and, more particularly, to improved bistable circuits for use in high speed logical systems.

In recent years there has been described in the literature, phase locked circuits for use in logical machines operating at high speeds and having long life and great reliability. These circuits are designed to provide at least two stable phases of carrier wave energy, each stable phase representing one bit of information. To produce the multi-phase circuits, non-linear capacitance, generally provided by a non-linear capacitance diode, is utilized in one form of these circuits and non-linear inductance, generally provided by a coil wound on a magnetic core, is utilized in another form of this circuit. The first form of these circuits is disclosed in U.S. Patent No. 2,815,488, granted to J. Von Neumann on December 3, 1957, and the second form of these circuits is described in British Patent 778,883, granted July 10, 1957. Circuits exhibiting the principles described in the above mentioned phase locked circuit have been generally referred to as parametric circuits, for example, parametric oscillators, parametric amplifiers, etc. A comprehensive list of articles on parametric circuits may be found in the May 1960 issue of the Proceedings of the IRE, on pages 848–853.

Parametric circuits have been found to be very useful in the design of electronic computing systems, but it also has been noted that non-linear capacitance diodes of a very high quality are necessary to produce desirable results in the prior art multi-stable parametric circuits and that the non-linear inductance circuits, sometimes called parametrons, do not operate at high frequencies.

An object of this invention is to provide an improved high speed bistable circuit.

Another object of this invention is to provide improved high speed logical circuits which operate at microwave frequencies.

A further object of the invention is to provide an amplitude bistable circuit useful in high speed logical systems.

Yet a further object of this invention is to provide a circuit useful in high speed logical systems, which is both direct current and carrier wave amplitude bistable.

Yet another object of this invention is to provide an improved amplitude bistable circuit which may be employed to produce an economical computing system operating at information rates in the order of 1 kmc.

In accordance with this invention, an amplitude bistable circuit is provided which includes the parallel combination of a non-linear resistor and a non-linear reactance and another reactance capable of resonating with the non-linear reactance at a given frequency coupled to a high frequency voltage source generating a voltage of the given frequency and further coupled to a resistive load and a direct current source. The circuit of this invention provides across the non-linear reactance a voltage-current characteristic curve which includes a negative resistance region that is utilized to produce high speed switching in logical operations based upon binary information.

An advantage of the circuit of this invention is that a reliable high speed amplitude bistable circuit is provided while employing a non-linear capacitance diode of a lower quality than that of those known to be used heretofore in the phase-locked parametric circuits.

The foregoing and other objects, features and advantages of the invention will be apparent from the following more particular description of preferred embodiments of the invention as illustrated in the accompanying drawings.

In the drawings:

FIG. 12 is a graph showing the incident energy plotted against the output energy of the circuit illustrated in FIG. 10 when a second given length of transmission line is used.

FIG. 13 illustrates another embodiment of a circuit of the present invention which may be used to perform threshold logic.

FIG. 14 shows a storage loop embodying the circuit of the present invention.

Figures 1, 2, 3:
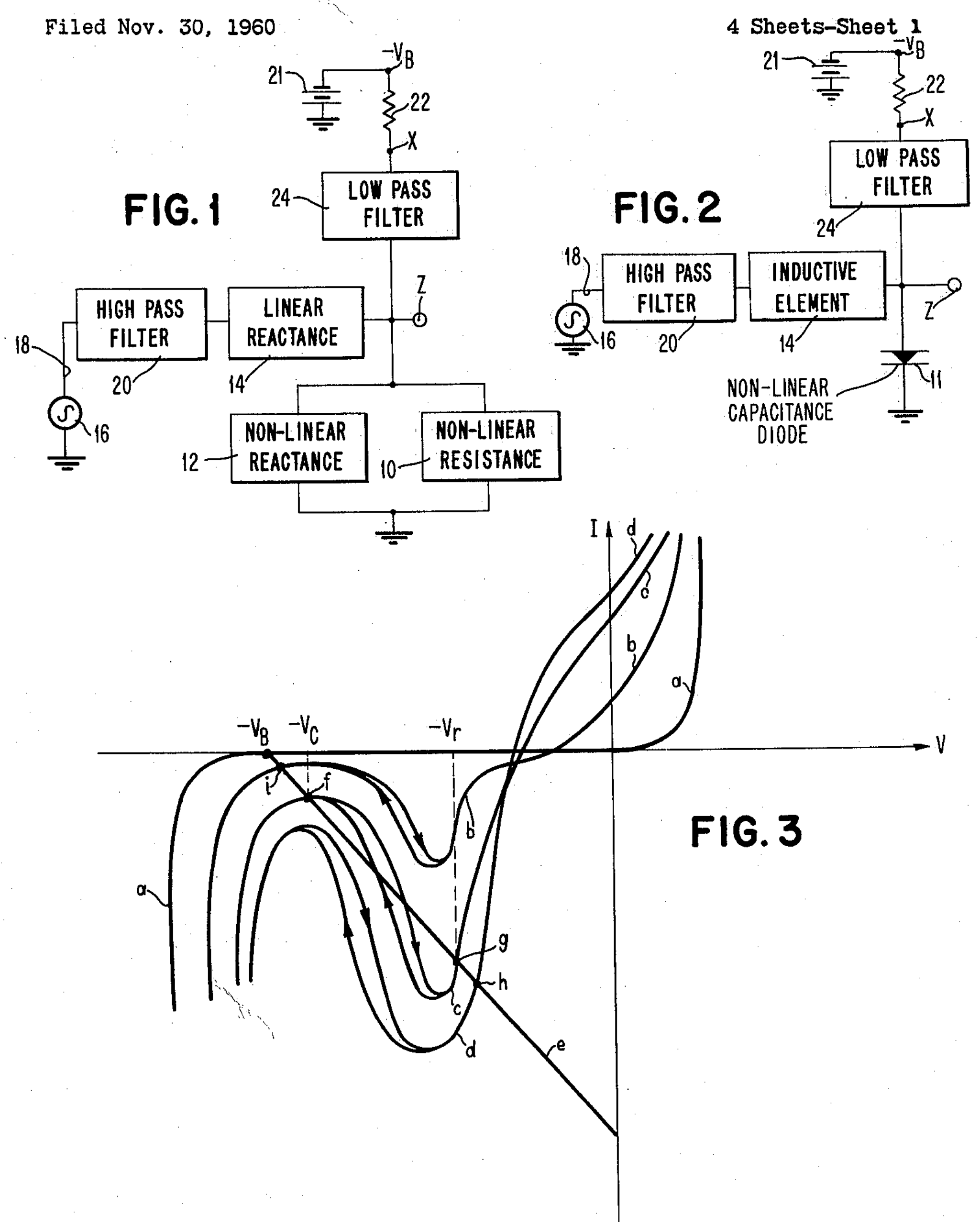
FIG. 1 illustrates an embodiment of the bistable circuit of this invention employing a series resonant circuit.
FIG. 2 shows a bistable circuit similar to that illustrated in FIG. 1 but wherein a non-linear capacitance diode is used to provide the non-linear reactance.
FIG. 3 is a graph showing the voltage-current characteristic curves provided across the non-linear reactance in the circuit of FIG. 1 for various values of carrier wave amplitude and further showing a direct current load line of the circuit intersecting points on the voltage-current characteristic curves.

Referring to the drawings in more detail, FIG. 1 illustrates one embodiment of the bistable circuit of this invention which includes a non-linear resistance 10 connected in parallel with a non-linear reactance 12, a linear reactance 14 connected in series with the parallelly connected non-linear elements 10, 12, an oscillator 16 coupled through a transmission line 18 including a high pass filter 20 to the linear reactance 14 and the non-linear reactance 12 and resistance 10 and a direct current voltage source 21, providing a negative voltage $-V_B$, coupled to the parallel circuit 10, 12 through a load resistor 22 and a low pass filter 24. The oscillator 16 may be an X–13 klystron generating a carrier wave at microwave frequencies, preferably in the X band, and the transmission line may be a waveguide, a stripline or a coaxial cable having suitable dimensions for transmitting the carrier wave produced by oscillator 16. The high pass filter has a cut-off frequency somewhat below the frequency of the carrier wave produced by the oscillator 16 so as to readily pass the carrier wave but to prevent the direct current energy from entering the oscillator 16. The low pass filter 24 has a cut-off frequency somewhat below the frequency of the carrier wave produced by the oscillator 16 so as to prevent the carrier wave from entering into the direct current voltage source 21. The non-linear resistance 10 and the non-linear reactance 12 may be any suitable non-linear elements but, preferably, these two non-linear elements 10, 12 are provided by using a non-linear capacitance diode commonly known as a "varactor." The required characteristics of the varactor, which is a diffused silicon type diode, are that it have a voltage dependent capacitance,, a voltage dependent shunt resistance that is capable of rectifying the carrier wave, a sharp breakdown characteristic, a low breakdown voltage, and a low series resistance.

In FIG. 2 of the drawing, a non-linear capacitance diode or a varactor 11 is shown in the bistable circuit of the invention replacing the non-linear resistance 10 and the non-linear reactance 12. Since the varactors provide a voltage dependent non-linear capacitance, the linear reactance 14 of FIG. 1 should be an inductive element 14', as indicated in FIG. 2, having an appropriate value so as to be at series resonance with the capacitance of the varactor 11 at the carrier frequency when a given value of direct current and carrier wave voltage is applied to the varactor 11. The remaining portions of the circuit shown in FIG. 2 may be similar to that illustrated in FIG. 1.

The curve *a* in FIG. 3 of the drawing shows the voltage-current characteristic as viewed from terminal X in FIG. 2 when no carrier wave energy is applied to the varactor 11. Curve *b* of FIG. 3 shows the voltage-current characteristic as viewed from terminal X when a first carrier wave of a given frequency and amplitude is applied to the varactor 11. Curve *c* of FIG. 3 shows the voltage-current characteristic as viewed from terminal X when a second carrier wave of the given frequency having an amplitude greater than that of the first carrier wave is applied to the varactor 11. Curve *d* of FIG. 3 also shows the voltage-current characteristic as viewed from terminal X when a third carrier wave of the given frequency having an amplitude greater than that of the second carrier wave is applied to the varactor 11. Line *e* in FIG. 3 is the direct current load line of the bistable circuit illustrated in FIG. 2 shown intersecting the current-voltage characteristic curves at a plurality of points. Load line *e* intersects curve *c* at at least two points but curves *b* and *d* each at only one point. It should be noted that the characteristic curves *b*, *c* and *d* in FIG. 3 show a negative resistance region with hysteresis. This negative resistance phenomenon is somewhat similar to that disclosed in the M. I. T. Radiation Laboratory Series, First Edition, 1948, vol. 15, pages 401 and 402.

Figure 4:
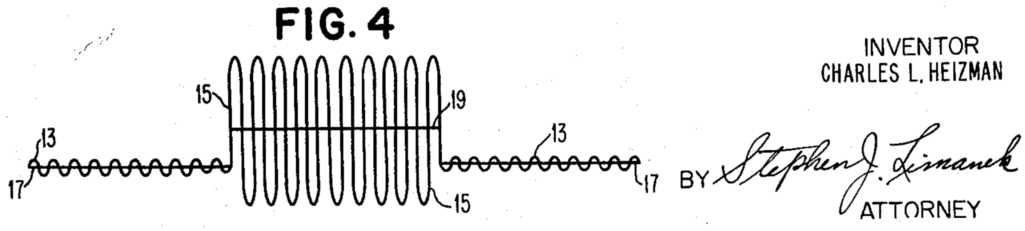
FIG. 4 is a graph illustrating the direct current and high frequency voltages at point $z$ at the two stable states of the circuit shown in FIG. 1.

In the operation of the circuits illustrated in FIGS. 1 and 2, when the oscillator 16 is turned on so as to build up a carrier wave amplitude sufficient to produce the voltage-current characteristic curve *c* shown in FIG. 3, the circuit will become stable at point *f* on the load line *e*. The circuit is designed so that at this first stable state the series circuit including the capacitance of varactor 11 and the inductive element 14' are not resonant. In this condition of the circuit, the amplitude of the carrier wave in the transmission line 18, such as, at point *z*, will have a given relatively small amplitude as indicated in FIG. 4 by wave 13. In order to switch the circuit to its other stable state, the negative bias voltage at point *x*, which is equal to $-V_c$ during the first stable state, is decreased by an amount sufficient to drive the voltage at point *x* to the value $V_r$ for operation of the circuit at the stable point *g* of the load line *e*. This change of state may be accomplished by applying suitable additional direct current voltages to point *x* from external circuits (not shown). Alternatively, the bistable circuit of this invention may be switched to its second stable state by increasing the amplitude of the carrier wave in the transmission line 18 by increasing the output from oscillator 16 or by adding appropriate carrier wave energy to the transmission line 18 from an external source so as to provide across the varactor 11 a carrier wave having an amplitude sufficient to produce the voltage current characteristic curve *d* shown in FIG. 3. Since the direct current load line *e* intersects curve *d* only at point *h*, the operating point on the load line *e* will switch from point *f*, the operating point of the first stable state to point *h*, the only point of intersection of load line *e* and curve *d*, and, thus, the only stable point on curve *d*. When the carrier wave in the transmission line 18 is reduced to the value which produces the voltage-current characteristic curve *c*, the circuit will then operate in its second stable state at point *g*, the intersection of the load line *e* and curve *c*. The circuit will continue to operate at point *g* of the load line *e* until the negative voltage at point *x* is again increased to the value $-V_C$ by applying an appropriate direct current voltage to point *x* of the circuit or, the amplitude of the carrier wave in transmission line 18 is reduced to a value which will produce the voltage-current characteristic curve *b* of FIG. 3. When the amplitude of the carrier wave is reduced, the operating point will shift from point *g* of the load line *e* to point *i*, the only point of intersection of load line *e* and curve *b*. The circuit will again operate in its first stable state, i.e., at points *f* of the load line *e*, by merely increasing the carrier wave to the value which produces the voltage-current characteristic curve *c*. When the circuit is operating in its second stable state, i.e., at point *g* of the load line *e*, the series circuit including the capacitance of varactor 11 and the inductive element 14' are resonant and the carrier wave has a large amplitude, as indicated by wave 15 in FIG. 4 of the drawing, compared with the amplitude of the carrier wave 13 which is produced when the circuit is operating in its first stable state. Furthermore, the direct current voltage at the low frequency terminal *x* of the circuit has different values as indicated by lines 17 and 19. It should be understood that when the circuit is resonant at the bias voltage $-V_r$ the amplitude of the carrier wave becomes large and extends into the reverse conduction region of the diode or varactor 11. This causes a large rectified current to flow at the bias terminal *x*. If the bias voltage is now varied, the circuit becomes non-resonant and the rectified current is reduced thus providing the negative resistance characteristic seen in curves *b*, *c* and *d* of FIG. 3. When diffused silicon varactors were used in the bistable circuit of this invention breakdown voltages of 5 to 7 volts and negative resistances of about 20 ohms with a peak current of about 2 milliamperes have been observed with a capacitance range from 0.5 pf. to 1.6 pf. Accordingly, it can be seen that the bistable circuit of this invention provides a direct current voltage having a first value and a carrier wave voltage having a first amplitude value when operating in its first stable state and a direct current voltage having a second value different from the first D.C. value and a carrier wave having a second amplitude value greater than the first carrier wave amplitude value when operating in its second stable state.

An important advantage of this circuit is that the time required for the circuit to switch from one stable state to the other stable state is very short, of the order of one millimicrosecond when the carrier wave is 10,000 megacycles.

The circuit of this invention has been described and illustrated as having a reverse bias applied to the diode on varactor 11, however, it should be understood that the circuit will provide similar results when a forward bias is applied to the diode or varactor 11. Although the use of varactors, of the type described hereinabove, is preferred, point contact diodes, e.g., 1N23B diodes having the required characteristics mentioned hereinabove, have been found to produce somewhat similar results.

Figure 5:
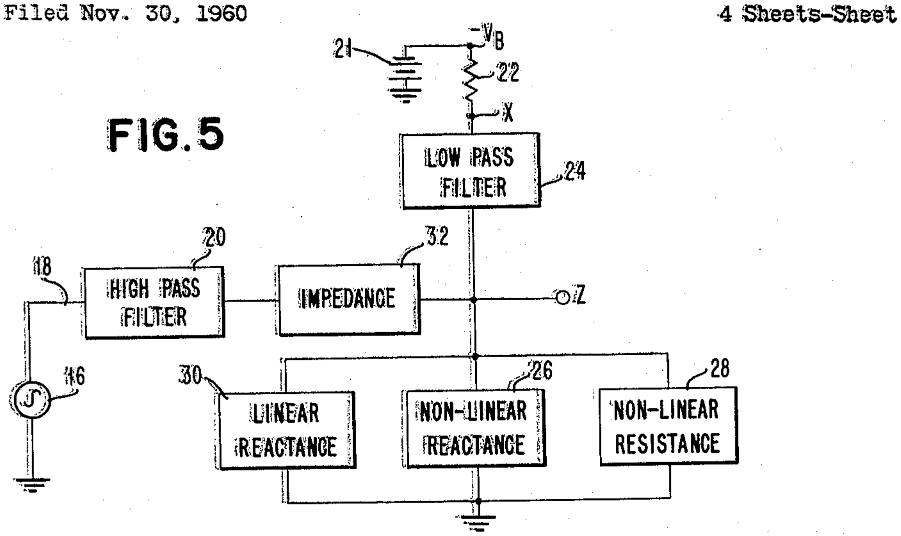
FIG. 5 shows another embodiment of the bistable circuit of the invention which is similar to the circuit illustrated in FIG. 1, but which includes a parallel resonant circuit.

Another embodiment of the invention is illustrated in FIG. 5 of the drawing which shows a non-linear reactance 26, a non-linear resistance 28 and a linear reactance 30 connected in parallel with each other, the oscillator 16 coupled to the parallel circuit 26, 28, 30 through the transmission line 18 which includes the high pass filter 20 and an impedance 32, and the direct current voltage source 21 coupled to the parallel circuit 26, 28, 30 through the load resistor 22 and the low pass filter 24. The non-linear reactance 26 and non-linear resistance 28 may be provided by using a single non-linear capacitance diode of the type used in the circuit illustrated in FIG. 2. The value of the linear reactance 30 is such as to provide a parallel resonant circuit with the non-linear reactance 26 at the frequency of the carrier wave generated by the oscillator 16 at one of the stable states of the circuit. The impedance 32 is provided to serve as a voltage divider. This impedance 32 may be either resistive, capacitive or inductive and preferably has a value which is intermediate the values of the parallel circuits 26, 28, 30 during one stable state when the circuit is resonant and the impedance of the parallel circuit 26, 28, 30 during the other stable state of the circuit when the circuit is non-resonant. The operation of the circuit illustrated in FIG. 5 is similar to the operation, described hereinabove, of the circuits illustrated in FIGS. 1 and 2.

Figures 6, 7:
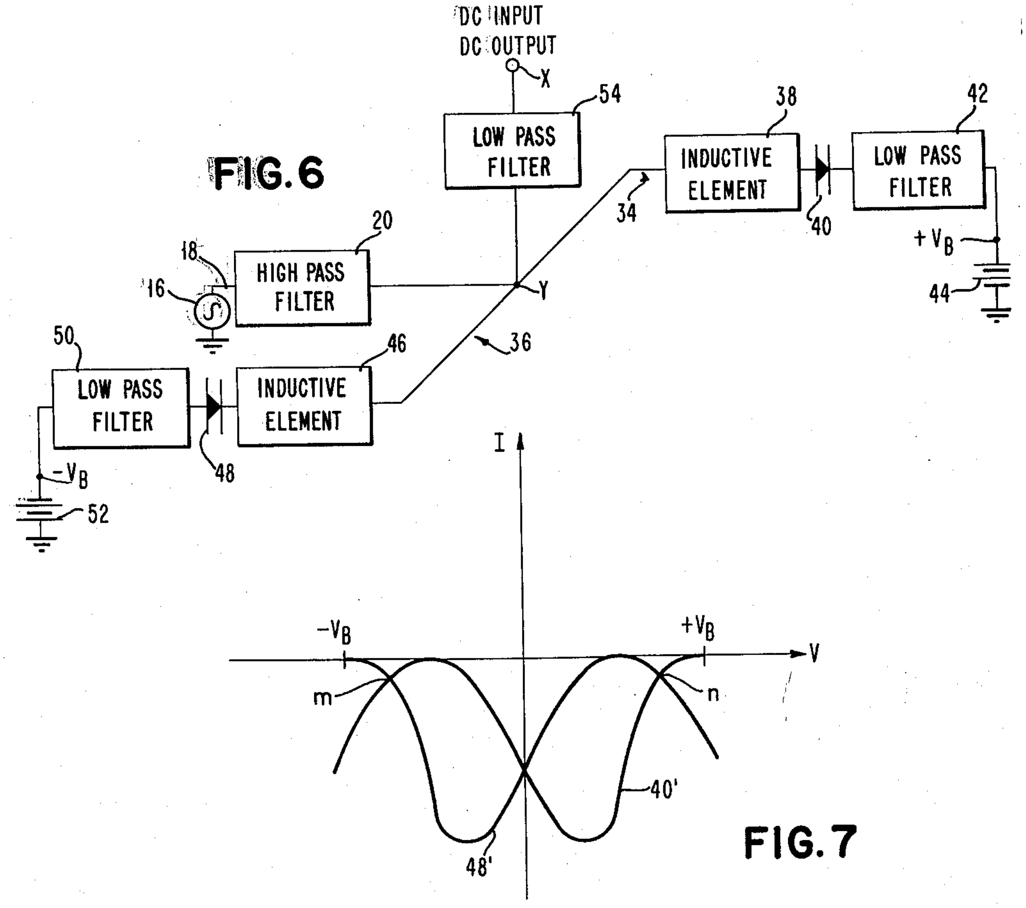
FIG. 6 illustrates a further embodiment of the present invention in the form of a two-diode bistable circuit.
FIG. 7 is a graph showing the voltage-current characteristic curve and the direct current load line of the circuit illustrated in FIG. 6.

FIG. 6 shows yet another embodiment of the present invention in the form of a two-diode bistable circuit. The bistable circuit shown in FIG. 6 comprises the oscillator 16 coupled through the transmission line 18 and the high pass filter 20 to a junction point $y$ of the first and second branches 34 and 36, the first branch 34 including, in series connection, an inductive element 38, a non-linear capacitance diode 40 of the type described in connection with the circuit illustrated in FIG. 2, a low pass filter 42 and a direct current voltage source 44 providing a terminal voltage having a value $+V_B$, and the second branch 36 including, in series connection, an inductive element 46, a non-linear capacitance diode 48, a low pass filter 50 and a direct current voltage source 52 providing a terminal voltage having a value $-V_B$. The two branches 34, 36 are preferably as symmetrical as possible, except that the diodes 40 and 48 are connected in reverse polarity with respect to the junction point $y$ of the two branches 34, 36 and the voltage sources 44 and 52 are connected to the diodes 40, 48 correspondingly.

FIG. 7 shows the voltage-current characteristic curve 40′ for the diode 40 of the circuit shown in FIG. 6 of the drawing when a carrier wave of a given amplitude is applied to the diode 40 from oscillator 16. This curve 40′ is generally of the form of curve $c$ shown in FIG. 3. The second branch 36 acts as the load across the diode 40. The direct current load line for this load is shown as curve 48′ in FIG. 7. It can be seen that this load line 48′ is non-linear and intersects the curve 40′ at points $m$ and $n$ which are the two stable operating points of the two-diode circuit. If desired, the first branch 34 may be considered as the load for the non-linear capacitance diode 48. In the operation of the circuit of FIG. 6, during one stable state of the circuit one diode passes a high current and the other diode passes a lower current. The state to which the circuit stabilizes when the oscillator 16 is turned on may be controlled by the polarity or value of an input signal which can be applied to the circuit at point $y$ through terminal $x$ and the low pass filter 54. Very high gain is achieved in this circuit since a very small input signal can determine the state at which the circuit stabilizes. The terminal $x$ may be used as the direct current input terminal and also as the direct current output terminal. If preferred, the direct current terminal $x$ and the low pass filter 54 may be eliminated and carrier wave signals of appropriate magnitude and phase may be applied to the transmission line 18 to control the circuit in a manner similar to that described hereinabove in connection with the circuit shown in FIG. 2.

The circuits illustrated in FIGS. 1, 2, 5 and 6 may be considered as computer amplifier circuits since they provide amplification, retiming and reshaping of input signals, and also as storage circuits. These basic circuits can be connected in systems to perform many types of high speed logical functions.

Figure 8:
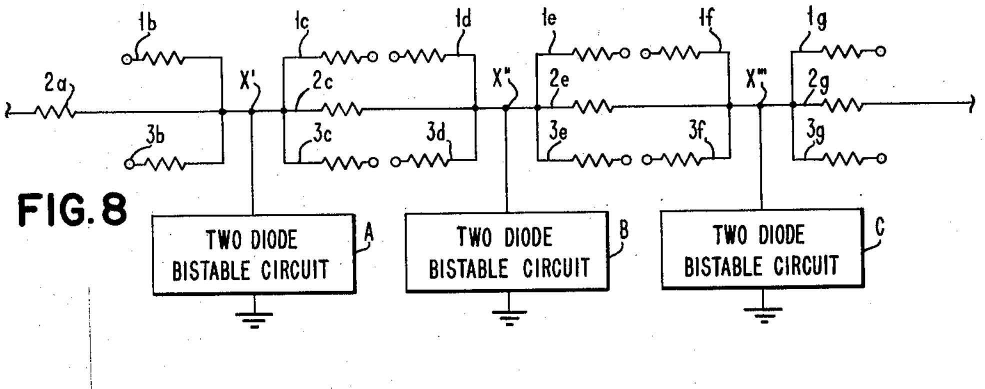
FIG. 8 illustrates a majority logic circuit employing the principles of the present invention.
Figure 9:
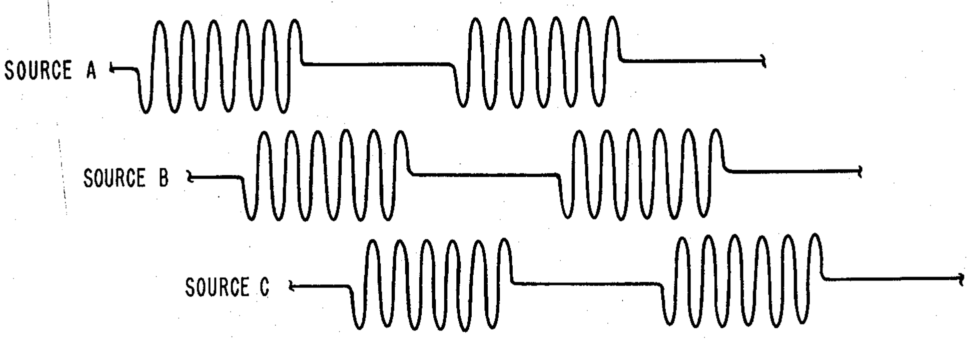
FIG. 9 illustrates the pulses of energy from the oscillator of the circuit of the invention which are utilized in the circuit illustrated in FIG. 8 to provide a unidirectional flow of information.

The circuit illustrated in FIG. 8 which embodies the principles of this invention can be connected so as to perform majority logic. This majority logic circuit includes a plurality of the two-diode bistable circuits A, B and C, each of the type illustrated in FIG. 6 of the drawing and described hereinabove in connection therewith. The two-diode bistable circuits are shown in FIG. 8 in block form with bistable circuit A having a direct current terminal $x'$ connected to three inputs $1b$, $2a$ and $3b$ and three outputs $1c$, $2c$ and $3c$, the bistable circuit B having a direct current terminal $x''$ connected to inputs $1d$, $2c$ and $3d$ and outputs $1e$, $2e$ and $3e$ and the bistable circuit C having a direct current terminal $x'''$ connected to inputs $1f$, $2e$ and $3f$ and outputs $1g$, $2g$ and $3g$, which outputs may be similarly coupled to additional similar bistable circuits (not shown). The values of the elements of the bistable circuits and the input signal values are selected so that the output signal from the bistable circuit A, B or C to which the input signals are applied indicates a majority when at least two selected input signals of the three input signals are present. In order to transfer the information through the majority logic circuit in only one direction, the carrier wave from the oscillator of each of the bistable circuits may be modulated and the phase of the modulation adjusted so that each succeeding circuit is supplied by a pulse of a carrier wave energy having a time duration greater than 120° of a cycle of operation but which is initiated as 120° after the initiation of a pulse applied to the immediately preceding circuit and 120° before the initiation of a pulse applied to the immediately succeeding circuit, as indicated in FIG. 9 of the drawing and described in more detail in U.S. Patent No. 2,815,488, granted to John Von Neumann on December 3, 1957, and in British Patent No. 778,883, granted on July 10, 1957. The pulses of carrier wave energy identified in FIG. 9 of the drawing as carrier A is the energy in the two-diode bistable circuit A derived from its oscillator and applied to the junction point $y$ between the two diodes 40 and 48 shown in FIG. 6 of the drawing, and carrier B and carrier C are corresponding energies in the bistable circuit B and the bistable circuit C, respectively. It can be seen in FIG. 9 that there is a timewise overlapping of the carrier wave energy in carrier A with respect to the carrier wave energy in carrier B. During the overlapping interval the information contained in the output of circuit A is transferred to the bistable circuit B. After carrier A energy is turned off, carrier C energy is applied to the bistable circuit C prior to the time that the energy of carrier B is turned off in circuit B. This cycle is then repeated for the next bit of information that is passed through the logic system from circuit A to circuit B and then to circuit C. The bit of information at the output of bistable circuit C may be passed on to similar bistable circuits operating in this same manner.

Figure 10:
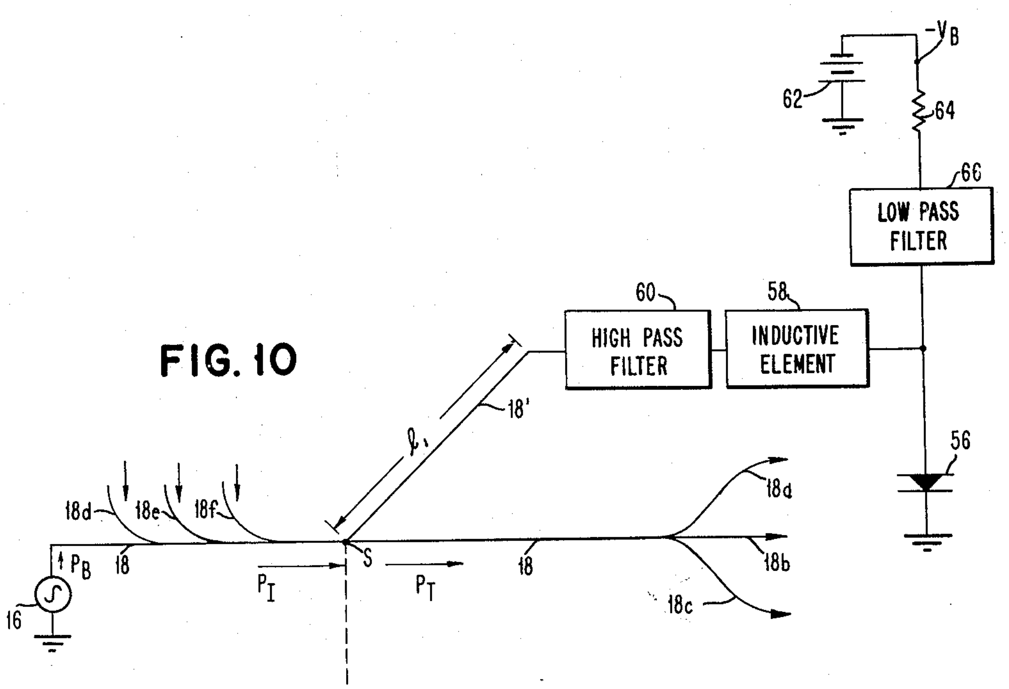
FIG. 10 illustrates an embodiment of a circuit of the present invention which may be used to perform threshold logic.
Figure 11:
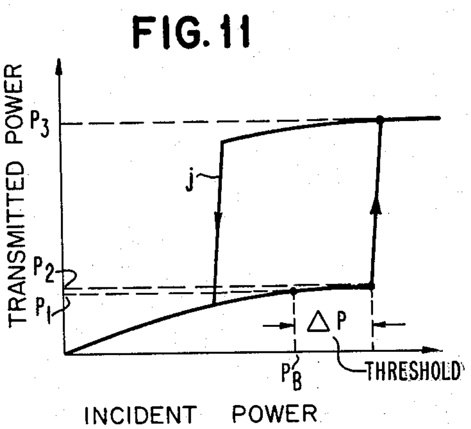
FIG. 11 is a graph showing the incident energy plotted against the output energy of the circuit illustrated in FIG. 10 when a first given length of transmission line is used.
Figure 11:
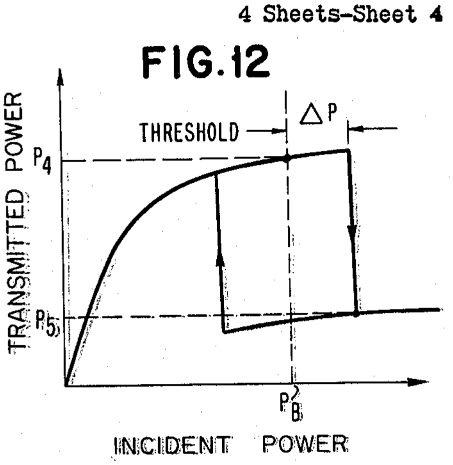
Figure 11:
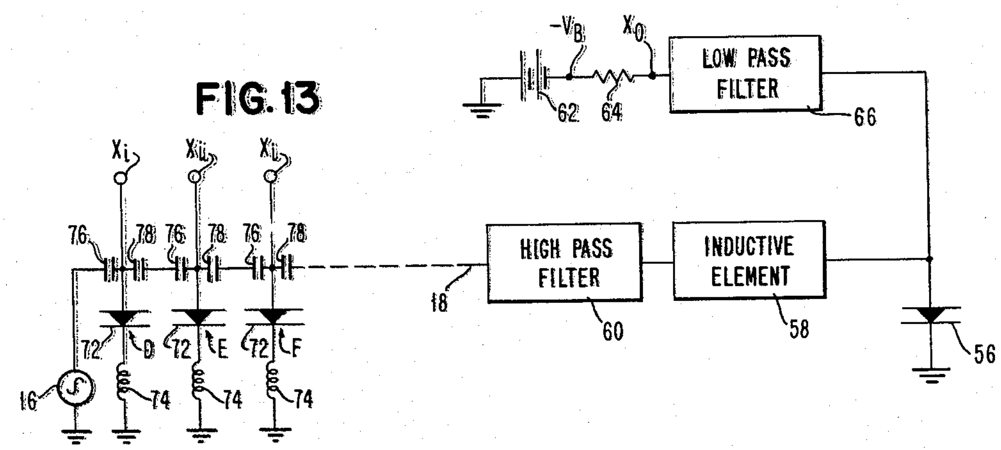
Figure 11:
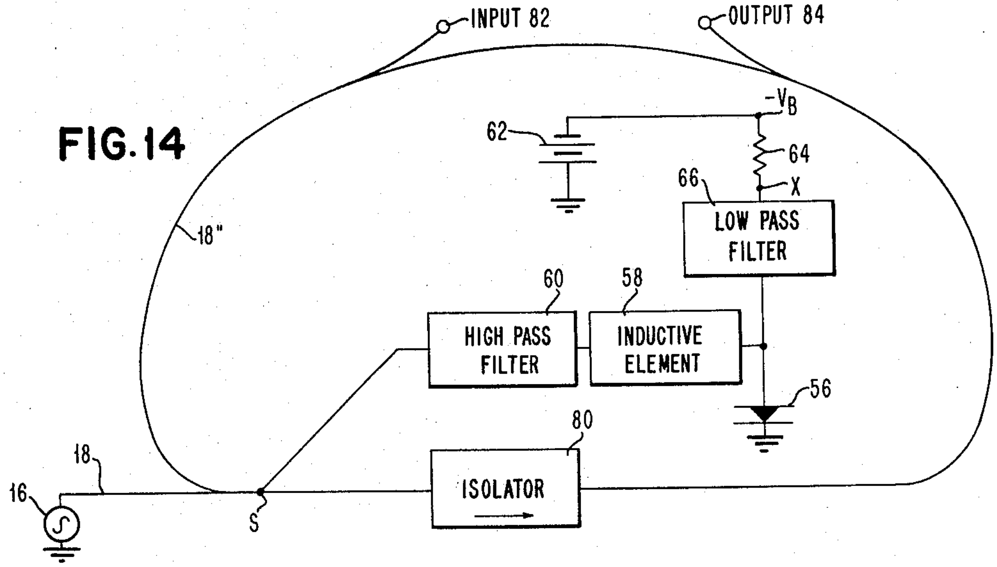

Another embodiment of a majority logic circuit which employs the principles of this invention is illustrated in FIG. 10 of the drawing. This majority logic circuit includes the oscillator 16, the transmission line 18 connected to three output lines $18a$, $18b$ and $18c$, a non-linear capacitance diode 56, of the type described hereinabove in connection with the circuit illustrated in FIG. 2, an inductive element 58 serially connected with the non-linear capacitance diode 56, a high pass filter 60 coupling diode 56 and inductive element 58 through a length 1, of transmission line 18′ to a point $s$ in the transmission line 18 intermediate the oscillator 16 and the output lines $18a$, $18b$ and $18c$ and a direct current voltage source 62 providing a terminal voltage $-V_B$ connected to the non-linear capacitance diode 56 through a load resistor 64 and a low pass filter 66 and three input lines $18d$, $18e$ and $18f$ coupled to transmission line 18 through suitable directional couplers at one or more locations between point $s$ of the transmission line 18 and the oscillator 16. It can be seen that this circuit is somewhat similar to the circuit illustrated in FIG. 2 of the drawing. The value of the voltage $-V_B$ produced by the direct current source 62 and the amount of energy $P_B$ of the carrier wave from oscillator 16 may be adjusted so that additional energy representing one or more bits of information may be required to switch the circuit from one stable state to the other stable state. This additional energy will change the impedance of the non-linear capacitance diode 56 which will produce an impedance change in the transmission line 18 at point *s*. As is well known to those skilled in the art, a variation in impedance at a point in a transmission line varies the amount of energy reflected from that point. Accordingly, the amount of energy reflected back toward oscillator 16 in the transmission line 18 is readily controlled by the input signals applied to the circuit and thus also the transmitted energy. The graph shown in FIG. 11 is a plot of the amount of energy applied to point *s* from the oscillator 16 and the input lines 18*d*, 18*e* and 18*f*, which may be referred to as incident energy, against the amount of energy which passes through point *s* in transmission line 18 to the output lines 18*a*, 18*b* and 18*c* connected to succeeding stages of the logical system in which this circuit may be incorporated. As indicated in FIG. 11 when the oscillator 16 of the circuit shown in FIG. 10 is turned on, the incident power applied to point *s* is equal to $P_B$ while the transmitted power is equal to $P_1$ and the circuit is in its first stable state. After an additional amount of incident power, $\Delta P$, is applied to point *s* so as to increase the transmitted power to an amount equal to $P_2$, the transmitted power will suddenly increase to the high value $P_3$ and the circuit will then operate in its second stable state. When the oscillator 16 of the circuit shown in FIG. 11 is turned off, the incident and transmitted power will return to zero in the manner indicated by line *j* in the graph of FIG. 11, the circuit exhibiting a hysteresis effect. It should be understood that the circuit may be readily adjusted so that energy from one of the input lines 18*d*, 18*e* or 18*f* will be sufficient to provide the threshold voltage $\Delta P$ to switch the circuit to its second stable state, thus providing an OR circuit, or so that energy from at least two of the three input lines 18*d*, 18*e* and 18*f* will be required to switch the circuit to its second stable state, this providing a majority circuit, or so that energy from all three input lines 18*d*, 18*e* and 18*f* is necessary to switch the circuit to its second stable state thus providing an AND circuit. Furthermore, if desired, a number of input lines other than three may be provided in the circuit of FIG. 10. In order to provide the power curve shown in FIG. 11, the transmission line 18′ between point *s* and the non-linear capacitance diode 56 must be adjusted so that when the inductive element 58 and the non-linear capacitance of the diode 56 are at series resonance, the circuit including the non-linear capacitance diode 56 appears at point *s* in transmission line 18 to be a high impedance. The circuit illustrated in FIG. 10 may also be used to accomplish inversion by properly adjusting the length of the transmission line 18′ coupling the elements between point *s* and the non-linear capacitance diode 56. FIG. 12 of the drawing shows a curve plotted in the same units as that of the curve shown in FIG. 11 for the circuit of FIG. 10 when it is used to provide inversion. As shown in FIG. 12 when the oscillator 16 of the circuit shown in FIG. 10 is turned on, the incident power applied to point *s* is equal to $P_B$ while the transmitted power is equal to $P_4$, substantially the maximum output power applied to the output lines 18*a*, 18*b* and 18*c*. When additional energy in an amount greater than the threshold value $\Delta P$ is applied to the transmission line 18 by input lines 18*d*, 18*e* or 18*f* the output or transmitted power will sharply decrease to $P_5$ causing the circuit to operate in its other stable state. To produce inversion by use of the circuit illustrated in FIG. 10, the length of the transmission line from point *s* to the non-linear capacitance diode 56 must be selected so that when the circuit provides the high transmitted or output power $P_4$, the transmission line 18′ appears from point *s* as a high impedance when the circuit is non-resonant at the frequency of the carrier wave produced by the oscillator 16. It can be seen that in this inversion circuit when input signals of a high energy value are received, output signals of a low energy value are produced.

Still another embodiment of a logical circuit employing the principles of the present invention is illustrated in FIG. 13. This circuit is somewhat similar to the circuit illustrated in FIG. 10 except that the input signals applied to this circuit are direct current voltage signals rather than carrier wave signals. The circuit illustrated in FIG. 13 includes the oscillator 16 coupled through transmission line 18 including high pass filter 60 to the inductive element 58 connected in series with the non-linear capacitance diode 56, the direct current voltage source 62 providing a terminal voltage having a value $-V_B$ connected to the non-linear capacitance diode 56 through the load resistor 64 and the low pass filter 66 and direct current input circuits D, E and F, each of the direct current input circuits including a non-linear capacitance diode or varactor 72 serially connected to an inductor 74 and having an input terminal $x_i$. The direct current energy applied to each of the terminals $x_i$ is prevented from entering into the carrier wave transmission line 18 by first and second capacitors 76 and 78. In the operation of this embodiment of the logical circuit, direct current signals are applied to the input terminals $x_i$ of the circuits D, E and F. Since a variation in applied voltage to the diodes 72 varies the impedance in the transmission line 18 at the point or points at which the diodes are coupled to line 18, the signals will control the amount of energy reflected back toward the oscillator 16 and, thus, the amount of energy transmitted and applied to the non-linear capacitance diode or varactor 56, which transmitted energy will determine the stable state of the circuit. The circuit illustrated in FIG. 13 may be used to perform the various logical functions mentioned hereinabove in connection with the description of the circuit shown in FIG. 10. The output signals from the circuit illustrated in FIG. 13 are preferably taken from terminal $x_o$ located between the load resistor 64 and the low pass filter 66. It should be noted that this circuit performs the desirable function of isolating the input and output from each other, and, therefore, the carrier wave from the oscillator 16 need not be modulated in the manner described hereinabove in connection with the description of the circuit shown in FIG. 8.

The circuit of the present invention may also be used to form a storage loop suitable for use in high speed logical systems as illustrated in FIG. 14 of the drawing. The storage loop shown in FIG. 14 comprises the oscillator 16 coupled through the transmission line 18 to the input of an isolator 80, e.g., a ferrite isolator, the series combination including the non-linear capacitance diode 56 and the inductive element 58 coupled through the high pass filter 60 to the transmission line 18 at the point *s* intermediate the input of the isolator 80 and the oscillator 16 and the direct current voltage source 62 providing a voltage terminal having a value $-V_B$ coupled to the non-linear capacitance diode 56 through the load resistor 64 and the low pass filter 66. The isolator 80 may be any one of the well known suitable devices which in one direction of energy transfer has no losses and in the opposite direction has very high losses. The output of the isolator 80 is fed back to the transmission line 18 at a point between the oscillator 16 and point *s* of the transmission line through a transmission line 18″. A carrier wave input terminal 82 may be connected to the transmission line 18″ for introducing information into the storage loop and a terminal 84 may be connected to the transmission line 18″ for feeding carrier wave information out of the loop. If desired, the input signals may be direct current voltage signal *s*, in which case they may be fed into the storage loop at point *x* between the load resistor 64 and the low pass filter 66 at which point direct current output signals will also be produced. To provide retiming and reshaping of the pulses in the storage loop the carrier wave from oscillator 16 may be modulated in a well known manner. At microwave frequencies, e.g., at 10,000 megacycles, the time required to store one bit of information in the loop of the storage circuit shown in FIG. 14 is in the order of one millimicrosecond. Such a bit of information requires a length of transmission line equivalent to one foot, thus, the number of bits of information which can be stored in the storage loop illustrated in FIG. 14 is dependent upon the length of the transmission line between the output of the isolator 80 and the input of the isolator 80. If desired, the transmitted or output energy from point *s* in transmission line 18, instead of being applied to the input of isolator 80, may be applied to two successive circuits similar to that shown in FIG. 14, coupled to the transmission line 18 at fixed spaced points. Thus, three stages are provided connected in cascade in which the carrier wave from each of the oscillators may be modulated to produce a unidirectional flow of information in the manner described hereinabove in connection with the circuit shown in FIG. 8. The circuit in FIG. 14 may be further modified by replacing the isolator 80 and the transmission line 18″ coupling the output of isolator 80 to the transmission line 18 by a shorted length of transmission line which would reflect pulses toward the point *s* in transmission line 18 at desired intervals.

Detailed connections between the elements, such as the diodes, and the transmission line of the circuit of this invention have not been described or illustrated since these connections are well known in the art. For these details reference may be had to copending applications of the common assignee filed by K. E. Schreiner and B. L. Havens on February 14, 1958, having Serial No. 715,353, and now Patent No. 2,987,253, K. E. Schreiner on June 6, 1958, having Serial No. 742,803, and now Patent No. 2,987,630, and H. P. Wolff on May 29, 1959, having Serial No. 816,884, and now Patent No. 3,069,629, to U.S. Patent No. 2,914,249 and to Sander Associates' Handbook of Tri-Plate Microwave Components, 1956 edition.

It can be readily seen that this invention provides a simple and economical high speed amplitude bistable circuit which can be used in electronic computing systems to carry out a great variety of logic functions.

While the invention has been particularly shown and described with reference to preferred embodiments thereof, it will be understood by those skilled in the art that various changes in form and details may be made therein without departing from the spirit and scope of the invention.

What is claimed is:

1. A circuit having a first and a second stable state comprising a non-linear reactance and a non-linear resistance coupled in parallel with said non-linear reactance, a linear reactance connected in series with said non-linear reactance, a source of carrier waves, a high pass filter coupling said source to said linear reactance, a resistor, a low pass filter coupling said resistor to said non-linear reactance and non-linear resistance, a source of direct current voltage coupled to said non-linear reactance and non-linear resistance through said resistor and said low pass filter, and means for applying a signal to said non-linear reactance and said non-linear resistance to switch the circuit from one of said first and second stable states to the other of said stable states.

2. A circuit having two stable states comprising a non-linear capacitance diode, an inductive element serially connected with said diode, a source of carrier wave energy, a high pass filter coupling said source to said serially connected inductive element and diode, means including a resistor for applying a direct current bias to said non-linear capacitance diode and means for applying a signal to said diode to switch the circuit from one of said two stable states to the other of said two states.

3. A circuit as set forth in claim 2 wherein said bias applying means applies a reverse bias to said diode.

References Cited by the Examiner

UNITED STATES PATENTS 2,992,398 7/61 Sterzer ---------------- 307—88

I. L. SRAGOW, *Primary Examiner.*